United States Patent [19]
Mao

[11] Patent Number: 5,242,963
[45] Date of Patent: Sep. 7, 1993

[54] PRESSURE SENSITIVE ADHESIVES COMPRISING TACKIFIED AQUEOUS VINYL ACETATE/ETHYLENE/ACRYLATE COPOLYMER DISPERSIONS

[75] Inventor: Chung-Ling Mao, Emmaus, Pa.

[73] Assignee: Air Products and Chemicals, Inc., Allentown, Pa.

[21] Appl. No.: 683,228

[22] Filed: Apr. 10, 1991

[51] Int. Cl.⁵ .................................................. C08J 3/00
[52] U.S. Cl. .................................... 524/272; 524/274; 524/77; 526/304
[58] Field of Search .................... 524/274, 77, 272; 526/304

[56] References Cited

U.S. PATENT DOCUMENTS

| | | | |
|---|---|---|---|
| 4,322,516 | 3/1982 | Wiest et al. | 526/307 |
| 4,645,711 | 2/1987 | Winslow et al. | 428/355 |
| 4,939,190 | 7/1990 | Tomioka et al. | 523/206 |

*Primary Examiner*—Paul R. Michl
*Assistant Examiner*—Edward Cain
*Attorney, Agent, or Firm*—Michael Leach; James C. Simmons; William F. Marsh

[57] ABSTRACT

A pressure sensitive adhesive composition comprising a vinyl acetate/ethylene/acrylate copolymer emulsion containing 5 to 60 wt % tackifier resin, on a total solids basis.

16 Claims, No Drawings

PRESSURE SENSITIVE ADHESIVES COMPRISING TACKIFIED AQUEOUS VINYL ACETATE/ETHYLENE/ACRYLATE COPOLYMER DISPERSIONS

TECHNICAL FIELD

The invention relates to pressure sensitive adhesives comprising aqueous vinyl acetate/ethylene (VAE) copolymer emulsions.

BACKGROUND OF THE INVENTION

Pressure sensitive adhesives are useful in making paper labels, vinyl film laminates, decals, and many other related products. The conventional tackified rubber-based paper labels often lose their adhesion properties upon long term exposure to heat or air. The unsaturation of the rubber backbone often requires additional stabilizers such as antioxidants to maintain its pressure sensitive adhesive properties. The high levels of tackifier loading in a rubber-based systems dramatically reduces the cohesive strength of the adhesive. As a result, edge ooze is often observed in large roll label stocks during storage or at converting operations. Tackified acrylic dispersion systems do minimize the oxidative and thermal stability problems of paper labels. However, edge ooze is not completely eliminated due to the impact of the tackifier incorporation. The cohesive strength (shear) value for a pressure sensitive adhesive composition are indicative of its edge oozing tendency.

U.S. Pat. No. 4,322,516 discloses vinyl acetate/ethylene/acrylate copolymers for pressure sensitive adhesives.

U.S. Pat. No. 4,645,711 discloses pressure sensitive adhesives comprising a copolymer of an alkyl acrylate monomer and an emulsifier monomer and also incorporating tackifier resin.

U.S. Pat. No. 4,939,190 discloses an aqueous acrylic emulsion prepared by polymerizing an ethylenically unsaturated monomer composition containing a specific monomer in the presence of a tackifier resin emulsion and then emulsion polymerizing an ethylenically unsaturated monomer composition containing a specific alkyl(meth)acrylate.

SUMMARY OF THE INVENTION

The present invention provides pressure sensitive adhesive compositions that exhibit excellent peel and tack adhesion to a wide variety of substances, particularly a variety of substances having low energy surfaces such as polyolefins, and maintain excellent cohesive strength, thus eliminating any concern of edge ooze and converting efficiency. The pressure sensitive adhesive compositions comprise an aqueous vinyl acetate/ethylene/acrylate copolymer emulsion and 5 to 60 wt % of a tackifier dispersion, on a total solids basis.

DETAILED DESCRIPTION OF THE INVENTION

The base aqueous polymer emulsions employed in the pressure sensitive adhesive compositions comprise VAE/acrylate copolymer emulsions in which the copolymer contains 5 to 40 wt % vinyl acetate, 5 to 30 wt % ethylene, 20 to 90 wt % acrylate monomer and, optionally, up to 40 wt % dialkyl maleate or fumarate and possesses a Tg ranging from $-70°$ to $-15°$ C. Preferably, the copolymer contains 10 to 25 wt % vinyl acetate, 10 to 25 wt % ethylene, 50 to 80 wt % acrylate monomer and, optionally, 5 to 40 wt % dialkyl maleate or fumarate. The acrylate monomer may suitably be an alkyl (meth)acrylate and/or a 2-hydroxyalkyl (meth)acrylate.

The alkyl acrylate may be an ester of acrylic acid or methacrylic acid with a $C_1$–$C_{10}$ alcohol such as methyl methacrylate, ethyl acrylate, butyl acrylate, hexyl acrylate, preferably an octyl acrylate such as 2-ethylhexyl acrylate, and the like. It is preferred to have about 25 to 75 wt % of the alkyl acrylate, especially the 2-ethylhexyl acrylate, in the copolymer.

As the dialkyl maleate or fumarate, one may suitably use the diesters of maleic acid or fumaric acid with a $C_1$–$C_{13}$, preferably $C_4$–$C_8$, alcohol such as octyl alcohol, 2-ethylhexyl alcohol, butyl alcohol, isobutyl alcohol, methyl alcohol, amyl alcohol and the like, preferably in an amount of 5 to 40 wt %.

The 2-hydroxyalkyl (meth)acrylate may suitably be 2-hydroxyethyl or 2-hydroxypropyl (meth)acrylate at preferably 1 to 5 wt %.

The VAE/acrylate copolymers may also contain 0.5 to 5 wt % of other copolymerizable monomers such as (meth)acrylamide and an alpha, beta-ethylenically unsaturated $C_3$–$C_6$ carboxylic acid, especially acrylic acid.

The aqueous copolymer emulsions can be readily prepared by conventional procedures known in the art, for example, the procedures taught in U.S. Pat. Nos. 4,322,516 and 4,908,268 which are incorporated by reference. A suitable VAE/acrylate copolymer emulsion and a suitable VAE/acrylate/maleate copolymer emulsion are marketed as Flexcryl® 1653 and 1652 emulsions, respectively, by Air Products and Chemicals, Inc.

The tackifier resins, which may be used as their aqueous dispersions, are simply mixed into the aqueous copolymer emulsion at preferably 20 to 40 wt %, based on total solids, for a pressure sensitive adhesive composition for application to PVC (vinyl) or polyester film in making plastic laminates. Higher levels of tackifier are suitable for making adhesives for paper labels.

Examples of tackifier resins which may be used in the pressure sensitive adhesive composition include the following:

1. Rosin Esters

Rosins comprise, as a main component, a mixed melt of a monovalent carboxylic acid having an alkyl hydrophenanthrene nucleus represented by $C_{20}H_{30}O_2$ which is contained in turpentine or a tall oil; various resin acids represented by $C_{19}H_{29}CO_2H$; and small amounts of neutral ingredients such as diterpene alcohols, aldehydes, $C_{18}$ aliphatic acid esters and terpene hydrocarbons.

The rosin esters are esters composed of such rosins and polyhydric alcohols such as glycerol, pentaerythritol and the like. Preferred examples include hydrogenated rosin esters and disproportionated rosin esters.

2. Petroleum Resins

Petroleum resins obtained by copolymerizing unsaturated hydrocarbons resulting from heat decomposition of naphtha. Preferred examples include aliphatic petroleum resins which are obtained by heat decomposing a light naphtha, separating $C_2$–$C_4$ unsaturated hydrocarbons, and polymerizing the resulting unsaturated hydrocarbon mixture composed mainly of $C_5$ aliphatic fractions, and aromatic petroleum resins which are obtained by heat decomposing a heavy naphtha, separating $C_6$–$C_8$ unsaturated hydrocarbons, and polymerizing the resulting unsaturated hydrocarbon mixture composed mainly of aromatic fractions.

3. Terpene Resins

Resins formed by polymerizing a turpentine oil containing a monocyclic terpene such as limonene or dipentene and/or a bicyclic terpene such as alpha-pinene, beta-pinene or camphene. Preferred examples include unmodified terpene resins, vinyl group-containing aromatic modified terpene resins and phenol-modified terpene resins.

The tackifier resins used in the pressure sensitive adhesive composition are used typically as their aqueous dispersions. Typical commercial aqueous dispersions of tackifiers are Aquatac dispersions from Arizona Chemicals, Snowtack dispersions from Albright and Wilson and Escorez hydrocarbon dispersions from Exxon Chemicals. Other materials which are known to be tackifiers and are compatible with vinyl acetate-based copolymer emulsions can also be used.

The base aqueous VAE/acrylate copolymer emulsion is simply blended with the selected tackifier dispersion in the desired ratio. The resulting pressure sensitive adhesive composition can be used for making paper labels such as electronic data processing (EDP) labels and general purpose permanent (GPP) paper labels, polyolefin, polyester and polyvinyl chloride film laminates, decals and tapes and many other related applications. The adhesive composition is applied to the face stock by coating operations well known in the art, such as direct or transfer coating.

In the following examples, the base copolymer emulsion was first mixed with the commercial tackifier dispersion in the designated ratio. The tackified copolymer dispersion was coated on a siliconized release liner, dried in an oven and laminated onto the designated face materials with a laminator (40 psi laminating pressure). The pressure sensitive adhesive construction was conditioned for 24 hours in a constant temperature/humidity room (23° C., 50% RH) before testing. The pressure sensitive adhesive performance properties were obtained according to PSTC test methods with one minute dwell for peel adhesion.

EXAMPLE 1

This example shows the preparation and the evaluation of a paper label using aqueous pressure sensitive adhesive compositions with and without a tackifier. Flexcryl 1653 VAE/acrylate copolymer emulsion (55% solids) was evaluated neat in Run 1. The copolymer is a vinyl acetate/ethylene/2-ethylhexyl acrylate copolymer having a Tg of about −37° C. In Run 2, 100 parts by wt Flexcryl 1653 copolymer emulsion adjusted to pH 6–7 with ammonium hydroxide (28%) was mixed with 39.5 parts by weight Aquatac 6085 dispersion (60% solids) to afford a tackified polymer dispersion of 70:30 copolymer:tackifier on a dry weight basis. The pressure sensitive adhesive dispersion was coated onto a siliconized release liner and dried in an oven at 70° C. for 5–10 minutes to give a uniform, thin film with a coatweight of 20–22 g/m². The thin film was then laminated onto a paper face material (60# Kromekote paper from Champion). The pressure sensitive adhesive paper label construction was conditioned at constant temperature and humidity for 24 hours. Runs 3 and 4 were repeated using Snowtack 301CF and Escorez 9241 tackifier dispersions. The pressure sensitive adhesive properties for the tackified and untackified adhesives are summarized in Table 1.

TABLE 1

| | RUN | | | |
|---|---|---|---|---|
| | 1 | 2 Aquatac | 3 Snowtack | 4 Escorez |
| Tackifier level (wt %) | 0 | 30 | 30 | 30 |
| 180° Peel (lb/in) | | | | |
| LDPE | 0.3 A | 3.1 A | 2.4 A | 3.4 A |
| Corrugated board | 2.0 PT | 2.5 CT | — | — |
| Loop Tack (lb/in) | | | | |
| LDPE | 0.6 A | 1.5 A | 1.5 A | 1.0 A |
| Corrugated board | 1.0 A | 2.5 FP | — | — |
| 178° Shear (hr) | 300+ | 300+ | 70 C | 114 C |
| (1" × 1" × 1 kg, on stainless steel) | | | | |

A = adhesion failure
PT = paper tear
CT = corrugated tear
FP = fiber pick
C = cohesive failure
LDPE = low density polyethlyene It can be seen from the data that blending 30 wt % tackifier into the Flexcryl 1653 emulsion provided significant improvements in the peel and loop tack strengths in Runs 2–4 and maintained the shear, or cohesive, strength in Run 2. Although the shear strength was reduced in the Runs using Snowtack and Escorez tackifier resins, the shear strength values are significantly better than all acrylic emulsions containing added tackifier and are suitable for most uses.

EXAMPLE 2

Following the same procedure described in Example 1, Flexcryl 1652 copolymer emulsion was used in place of Flexcryl 1653 copolymer emulsion and blended with 30 wt % Aquatac 6085, Snowtack 301CF and Escorez 9241 tackifier dispersions. Flexcryl 1652 VAE/acrylate/maleate copolymer emulsion (55% solids) was evaluated neat in Run 5. The copolymer is a vinyl acetate/ethylene/2-ethylhexyl acrylate/dioctyl maleate copolymer having a Tg of about −40° C. The pressure sensitive adhesive properties of the paper label applied to low density polyethylene are presented in Table 2.

TABLE 2

| | RUN | | | |
|---|---|---|---|---|
| | 5 | 6 | 7 | 8 |
| Tackifier | None | Aquatac | Snowtack | Escorez |
| 180° Peel (lb/hr) | 0.8 A | 3.2 A | 4.0 A | 4.3 PT |
| Loop Tack (lb/in) | 0.6 A | 1.6 A | 1.4 A | 1.8 A |
| 178° Shear (hr) (1" × 1" × 1 kg) | 200 | 90 C | 14 C | 27 C |

Again the addition of a tackifier to the copolymer emulsion provided for significant improvement in peel and loop tack values. Although the shear values were much lower than the neat copolymer emulsion, the shear strength would be more than sufficient to avoid edge ooze in the commercial production of paper labels.

EXAMPLE 3

Following the procedure of Example 1, pressure sensitive adhesive compositions comprising Flexcryl 1652 emulsion and 40 and 50 wt % Aquatac 6085 dispersions were prepared. The pressure sensitive adhesive performance of these compositions on paper labels are presented in Table 3.

TABLE 3

| | RUN | | |
|---|---|---|---|
| | 9 | 10 | 11 |
| Tackifier (wt %) | 0 | 40 | 50 |
| 180° Peel (lb/hr) | 0.8 A | 4.4 PT | 4.6 PT |
| Loop Tack (lb/in) | 0.6 A | 2.3 A | 1.5 A |
| 178° Shear (hr) | 200 | 70 C | 20 C |

Increasing amounts of Aquatac tackifier provided decreasing shear values.

EXAMPLE 4

This example shows the preparation of plastic film labels. Following the procedure in Example 1, various levels of Aquatac 6085 tackifier dispersion were blended with Flexcryl 1653 copolymer emulsion. The pressure sensitive adhesive compositions thus prepared were coated onto a siliconized release liner (90 lbs Polyslik from H. P. Smith) dried and laminated onto 2 mil polyester film (Mylar film from DuPont) with a coatweight of 25-27 g/m² (about 1 mil thickness of dry adhesive). The pressure sensitive adhesive properties were measured according to PSTC test methods on stainless steel after 24 hours conditioning at 23° C. and 50% relative humidity.

TABLE 4

| | RUN | | | |
|---|---|---|---|---|
| | 12 | 13 | 14 | 15 |
| Tackifier Level (wt %) | 0 | 20 | 30 | 40 |
| 180° Peel (lb/hr) (30 min dwell) | 2.8 | 3.3 | 3.8 | 3.8 |
| Loop Tack (lb/in) | 1.0 | 1.5 | 3.4 | 1.8 |
| 178° Shear (hr) | 200+ | 200+ | 200+ | 200+ |

The incorporation of the tackifier into the copolymer emulsion resulted in improvement in peel and loop tack while maintaining the high shear values. It appears that a composition containing 30 wt % tackifier afforded the best balance of properties.

EXAMPLE 5

The procedure of Example 4 was followed except that Flexcryl 1653 emulsion was replaced with Flexcryl 1652 VAE/acrylate/maleate copolymer emulsion using a coat weight of 33-35 g/m² (1.2-1.3 mil thickness of dry adhesive).

The pressure sensitive adhesive film constructions Runs 16-19 were thermally aged in a 60° C. oven for seven days, cooled to ambient temperature and conditioned in the constant temperature and humidity room for 24 hours. The pressure sensitive adhesive properties were then measured on stainless steel surface according to PSTC test methods. The peel adhesion of the thermally aged samples were compared to the initial unaged samples.

TABLE 5

| | RUN | | | |
|---|---|---|---|---|
| | 16 | 17 | 18 | 19 |
| Tackifier level (wt %) | 0 | 10 | 20 | 30 |
| 180° Peel (lb/hr) | | | | |
| Initial | 3.8 | 3.9 | 4.2 | 4.3 |
| Aged | 2.9 | 3.5 | 4.0 | 4.5 |
| Loop Tack (lb/in) | 2.3 | 3.1 | 3.3 | 3.7 |
| 178° Shear (hr) | 200+ | 200+ | 200+ | 200+ |

The data shows that the incorporation of Aquatac tackifier into the Flexcryl 1652 emulsion provided for improved peel strength of the aged adhesive composition while maintaining the high shear values.

EXAMPLE 6

The procedure described in Example 5 was followed except that the polyester film was replaced by a 3.5-4.0 mil polymeric plasticized, flexible PVC film. The pressure sensitive adhesive performance properties for both the initial samples and the thermally aged samples are shown in Table 6.

TABLE 6

| | RUN | | | | |
|---|---|---|---|---|---|
| | 20 | 21 | 22 | 23 | 24 |
| Tackifier level (wt %) | 0 | 10 | 20 | 30 | 40 |
| 180° Peel (lb/hr) | | | | | |
| Initial | 4.1 | 4.0 | 4.1 | 4.8 | 5.0 |
| Aged | 3.2 | 3.7 | 3.8 | 4.3 | 4.8 |
| Loop Tack (lb/in) | 3.5 | 3.5 | 4.2 | 4.3 | 5.3 |
| 178° Shear | 200+ | 200+ | 200+ | 200+ | 200+ |

Again, the data shows the improved peel strength for the aged pressure sensitive adhesive composition containing the tackifier while maintaining the high shear values.

STATEMENT OF INDUSTRIAL APPLICATION

The present invention provides pressure sensitive adhesive compositions that can be used for making paper labels, polyolefin, polyvinyl chloride and polyester film laminates and decals and other related applications.

I claim:

1. In a tackified pressure sensitive adhesive composition comprising an aqueous pressure sensitive adhesive polymer emulsion and a tackifier for such polymer, the improvement which comprises as the adhesive polymer emulsion a vinyl acetate/ethylene/acrylate copolymer emulsion in which the copolymer consists essentially of 10 to 25 wt % vinyl acetate, 10 to 25 wt % ethylene, 50 to 80 wt % acrylate monomer, and 5 to 40 wt % dialkyl maleate or fumarate and possesses a Tg ranging from −70° to −15° C.

2. The adhesive composition of claim 1 in which the tackifier is a rosin ester, a petroleum resin or a terpene resin.

3. The adhesive composition of claim 1 in which the acrylate monomer comprises an alkyl (meth)acrylate or a 2-hydroxyalkyl (meth)acrylate, or both.

4. The adhesive composition of claim 1 in which the copolymer is a vinyl acetate/ethylene/2-ethylhexyl acrylate copolymer.

5. The adhesive composition of claim 1 in which the copolymer is a vinyl acetate/ethylene/2-ethylhexyl acrylate/dioctyl maleate copolymer.

6. A pressure sensitive adhesive composition consisting essentially of an aqueous vinyl acetate/ethylene/acrylate copolymer emulsion in which the copolymer consists essentially of 10 to 25 wt % vinyl acetate, 10 to 25 wt % ethylene, 50 to 80 wt % acrylate monomer and 5 to 40 wt % dialkyl maleate or fumarate and possesses a Tg ranging from −70° to −15° C. and 5 to 60 wt % tackifier resin, on a total solids basis.

7. The adhesive composition of claim 6 in which the tackifier is a rosin ester, a petroleum resin or a terpene resin.

8. The adhesive composition of claim 7 in which the copolymer is a vinyl acetate/ethylene/2-ethylhexyl acrylate copolymer.

9. The adhesive composition of claim 7 in which the copolymer is a vinyl acetate/ethylene/2-ethylhexyl acrylate/dioctyl maleate copolymer.

10. A polyolefin, polyester, or polyvinyl chloride film coated with the adhesive composition of claim 6.

11. A polyolefin, polyester, or polyvinyl chloride film coated with the adhesive composition of claim 7.

12. A polyolefin, polyester, or polyvinyl chloride film coated with the adhesive composition of claim 8.

13. A polyolefin, polyester, or polyvinyl chloride film coated with the adhesive composition of claim 9.

14. A paper label coated with the adhesive composition of claim 6.

15. A paper label coated with the adhesive composition of claim 7.

16. A paper label coated with the adhesive composition of claim 9.

* * * * *